(12) United States Patent
Isaksson

(10) Patent No.: US 10,181,751 B2
(45) Date of Patent: Jan. 15, 2019

(54) DEVICE AND METHOD FOR POWER DISTURBANCE DETECTION

(71) Applicant: Telefonaktiebolaget L M Ericsson (publ), Stockholm (SE)

(72) Inventor: Henrik Isaksson, Torslanda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 332 days.

(21) Appl. No.: 14/433,212

(22) PCT Filed: Oct. 18, 2012

(86) PCT No.: PCT/EP2012/070656
§ 371 (c)(1),
(2) Date: Apr. 2, 2015

(87) PCT Pub. No.: WO2014/060038
PCT Pub. Date: Apr. 24, 2014

(65) Prior Publication Data
US 2015/0256027 A1     Sep. 10, 2015

(51) Int. Cl.
*H02J 7/00*     (2006.01)
*H02J 9/00*     (2006.01)
(Continued)

(52) U.S. Cl.
CPC .................................. *H02J 9/04* (2013.01); *H02J 9/06* (2013.01); *Y10T 307/625* (2015.04)

(58) Field of Classification Search
CPC ............ H02J 9/04; H02J 9/06; Y10T 307/625
(Continued)

(56) References Cited

U.S. PATENT DOCUMENTS

2006/0261751 A1* 11/2006 Okabe ...................... H02H 3/18
315/291
2011/0227416 A1     9/2011 Lecourtier
(Continued)

FOREIGN PATENT DOCUMENTS

| JP | H10052053 A1 | 2/1998 |
|---|---|---|
| JP | 2002186198 A1 | 6/2002 |
| WO | 2005001961 A2 | 1/2005 |

OTHER PUBLICATIONS

International Search Report and Written Opinion dated Aug. 1, 2014 for International Application Serial No. PCT/EP2012/070656, International Filing Date—Oct. 18, 2012 consisting of 6-pages.
(Continued)

*Primary Examiner* — Richard Tan
(74) *Attorney, Agent, or Firm* — Christopher & Weisberg, P.A.

(57) ABSTRACT

An energy supply device with connection portion for an energy source and an energy consumer. The energy supply device is arranged to feed energy from an energy source to an energy consumer, and also comprises energy storage for supplying a connected energy consumer with energy in the event of an interruption of energy supply. There is also a control unit and sensing portion for sensing an energy flow to and/or from the energy storage portion. The sensing portion is connected to the control unit which detects a power disturbance if there is an energy flow from the energy storage portion during a predefined length of time.

20 Claims, 6 Drawing Sheets

E, $E_{1,2}$: Energy flow, startup

(51) Int. Cl.
*H02J 9/04* (2006.01)
*H02J 9/06* (2006.01)

(58) Field of Classification Search
USPC .......................................................... 307/66
See application file for complete search history.

(56) References Cited

U.S. PATENT DOCUMENTS

2012/0025802 A1    2/2012  Carmen
2013/0094262 A1*  4/2013  Avrutsky ............. G01R 31/028
                                                             363/125

OTHER PUBLICATIONS

Database WPI Week 200335 Thomson Scientific, London, GB; AN 2003-366599 XP002721992, & JP 2002 186198 A (NEC Corp) Jun. 28, 2002 consisting of 2-pages.
Chinese Language 1st Chinese Office Action with its English Translation dated Feb. 4, 2017 for Chinese National Stage Application Serial No. 2012800762305 consisting of 8-pages.
Chinese Language 2nd Chinese Office Action with its English Translation dated Nov. 3, 2017 for Chinese National Stage Application Serial No. 2012800762305 consisting of 5-pages.

* cited by examiner

E, E$_{1,2}$: Energy flow, startup

E: Energy flow, "steady state"

DEVICE AND METHOD FOR POWER DISTURBANCE DETECTION

TECHNICAL FIELD

The present invention discloses a device and a method for power disturbance detection.

BACKGROUND

In almost any kind of equipment that operates by means of electrical energy, a disturbance or interruption of the supply of electrical energy will prove bothersome, and in many kinds of sensitive equipments an unexpected power disturbance, such as interruption or outage can prove directly harmful if not fatal to the equipment. In addition, even in those cases in which the power disturbance is not directly harmful to the equipment as such, it will prove bothersome to users of the equipment.

Thus, any kind of electrically powered equipment which needs to have a high degree of reliability and availability needs to be equipped with means for handling power disturbances, sometimes also referred to as power line disturbances, PLDs. In addition, naturally, the sooner that a PLD can be detected, the better, since the equipment in question can then initiate its PLD handling equipment or procedure. In certain kinds of sensitive equipments, the PLD handling procedure can simply be to shut down the equipment in a controlled manner, since this is better than to have the equipment shut down abruptly due to a PLD. Electrically powered equipments may also sometimes comprise some sort of auxiliary power supply, which will be turned on in the event of a PLD. In both of these cases, it will be realized that the sooner a PLD is detected, the better.

Known techniques for detecting PLD events are based on detecting the voltage level on a power input line. This technique works well, but if the input voltage changes slowly, this method leads to a slow detection of a PLD event. This method also needs high precision in the detection mechanism/circuitry.

SUMMARY

It is a purpose of the invention to obviate some of the drawbacks mentioned above of known PLD detection techniques, and to provide a device and a method for more rapid PLD detection than has previously been available.

This purpose is obtained by means of an energy supply device with connection means for an energy source and connection means for an energy consumer.

The energy supply device is arranged to feed energy from a connected energy source to a connected energy consumer, and the energy supply device also comprises energy storage means which are arranged to store energy from a connected energy source and to supply a connected energy consumer with energy in the event of an interruption of energy supply from the connected energy source.

The energy supply device also comprises a control unit and sensing means for sensing an energy flow to and/or from the energy storage means. The sensing means are connected to the control unit, and the control unit is arranged to detect a power disturbance if there is an energy flow from the energy storage means during a predefined length of time.

In embodiments of the energy supply device, the control unit is arranged to send an alarm signal to the energy consumer in the case of a detection of a power disturbance.

In embodiments, the energy supply device is arranged to prevent a flow of energy from the energy storage means to a connected energy source.

In embodiments, the energy supply device is arranged to detect a power disturbance if there is an energy flow change over the energy storage means as well as an energy flow change over a connected energy source which is more rapid than the energy flow change over the energy storage means during said predefined length of time.

In embodiments, the energy supply device is arranged so that an energy flow change over the energy storage means will always be slower than an energy flow change over a connected energy source.

In embodiments, the energy supply device is arranged to detect the cessation of a power disturbance if, following a detected power disturbance, there is no energy flow from the energy storage means during a predefined length of time. In embodiments, the control unit is arranged to send a signal to the energy consumer that the detected power disturbance has ceased.

In embodiments, the energy supply device is arranged to detect the cessation of a power disturbance if there is also a voltage increase over the energy storage means and a voltage increase over a connected power supply, and the two voltage increases do not differ from each other more than a predefined limit.

In embodiments, the control unit is also arranged to send an alarm signal to the energy consumer in the case of a detection of a cessation.

The invention also discloses a method for detecting a disturbance in the power supplied from a power supply to an energy consumer. The method comprises supplying energy from the energy supply to the energy consumer and also storing energy in an energy storage unit which is connected to the energy consumer. The method further comprises monitoring the energy flow from the energy storage unit, and detecting a disturbance in the power supplied from the power supply to the energy consumer if there is an energy flow from the energy storage during a predefined length of time.

BRIEF DESCRIPTION OF THE DRAWINGS

The invention will be described in more detail in the following, with reference to the appended drawings, in which.

DETAILED DESCRIPTION

Figure 1:
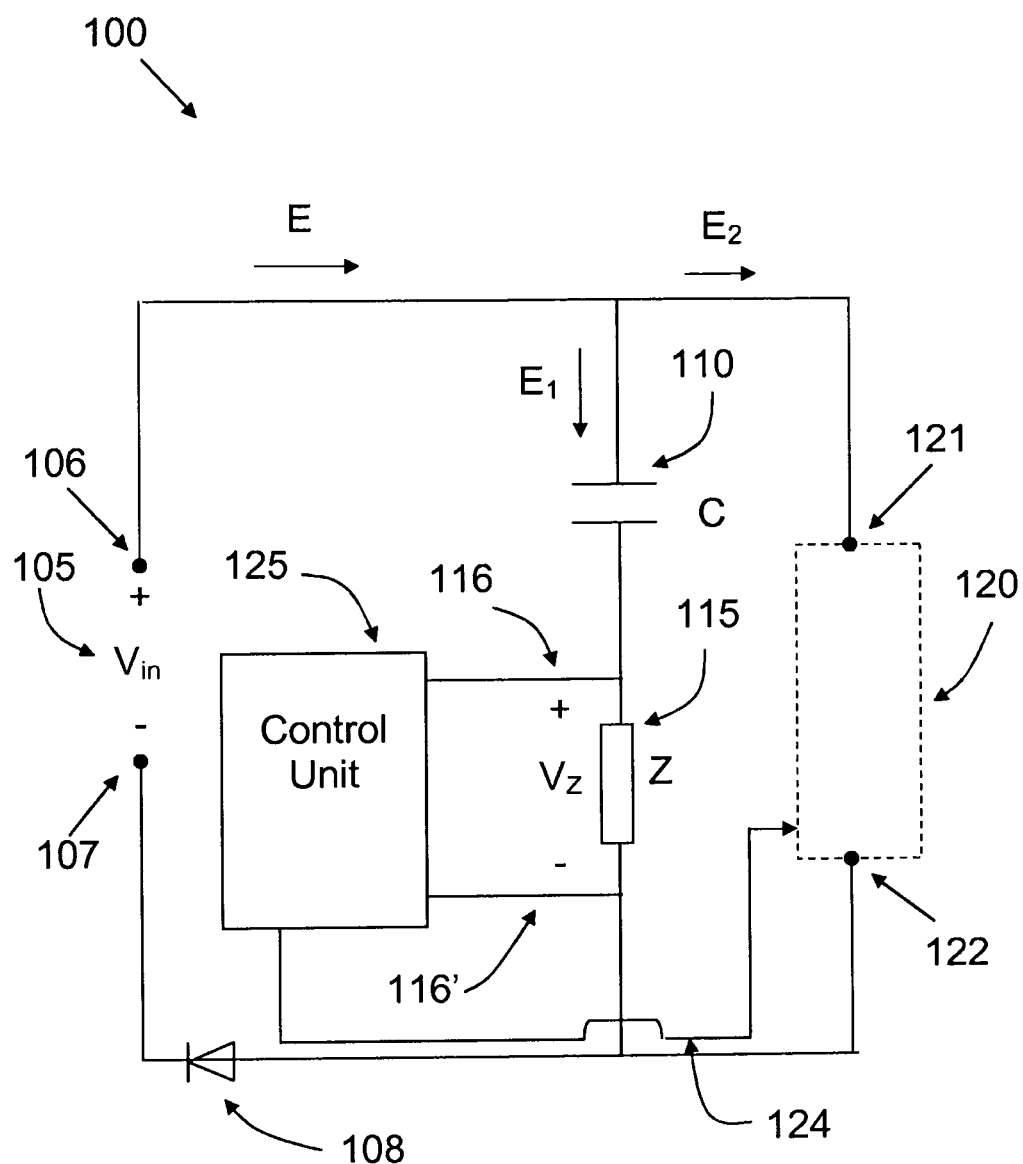
FIGS. 1-3 show an energy supply device in various stages of operation.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an energy supply device 100. The energy supply device 100 is intended to supply energy from an energy source to an energy consumer, and therefore comprises connection means 121, 122 for an energy consumer 120, as well as connection means for 106, 107 for an energy source 105.

In order to assure an uninterrupted energy supply to a connected energy consumer 120, the energy supply device 100 also comprises an energy storage unit 110, here in the form of a so called "hold-up capacitor". During start-up of the energy supply device 100, the hold-up capacitor stores a certain amount of energy, in order to be able to supply a connected energy consumer 120 with energy in the event of a power line disturbance, PLD. It should be pointed out that although the energy storage unit 110 is here, and in the drawings exemplified by means of a hold-up capacitor, other such energy storage means can naturally also be used, e.g. rechargeable batteries.

During "normal" operation of the energy supply device 100, i.e. when energy is supplied to a connected energy consumer 120 from a connected energy source 105, the hold-up capacitor 110 is passive in the sense that it does not release energy. However, during such normal operation, the hold-up capacitor 110 may need to "top up" the energy stored in it, due to, e.g., leakage.

There is a diode 108 comprised in the energy supply device 100, which serves to prevent energy flowing from the hold-up capacitor 110 to a connected energy source 105. The diode 108 also serves to ensure that an energy flow change over the hold-up capacitor 110 will always be slower than an energy flow change over a connected energy source, since, due to the diode 108, a voltage slope over a connected energy source can never be slower than a voltage slope over the hold-up capacitor 110.

As shown in FIG. 1, the energy supply device 100 also comprises a control unit 125, which is arranged to control the function of the energy supply device 100. As will be described in more detail later, the control unit 125 is also arranged to detect a PLD event, and in the event of such a detection, to send an alarm signal to a connected energy consumer 120, in order to enable the energy consumer 120 to take steps necessary in the case of a PLD event, e.g. a controlled shutdown of all or parts of its operation. As mentioned, the control unit's detection of PLD events will be described in more detail later, but briefly, as can be seen in FIG. 1, the energy supply 100 also comprises sensing means which enable the control unit to sense the direction of the energy flow to and/or from the hold-up capacitor 110, and thereby to draw conclusions regarding the presence or absence of a PLD event. The sensing means shown in FIG. 1 comprise an impedance Z 115, e.g. a resistor, and connections 116, 116', which enable the control unit 125 to measure the voltage $V_z$ over the impedance 115. If a PLD event is detected by the control unit 125, there is a connection 124 from the control unit 125 to the energy consumer 120 which enables the control unit to signal that a PLD event has been detected, and/or that the detected PLD event has ceased.

In FIG. 1, the energy flow E during start up of the energy supply device 100 is shown: as indicated, there is an energy flow E from a connected energy source 105 towards a connected energy consumer 120. In addition, during a start up phase, the hold-up capacitor 110 also "absorbs" energy, i.e. stores energy in order to be able to discharge energy towards a connected energy consumer 120 during, for example, a PLD event. Thus, the energy flow E from the energy source 105 is split into two parts, one part, $E_2$, goes to the energy consumer 120 and another part $E_1$ goes to the hold-up capacitor 110 in order to be stored there.

Figure 2:
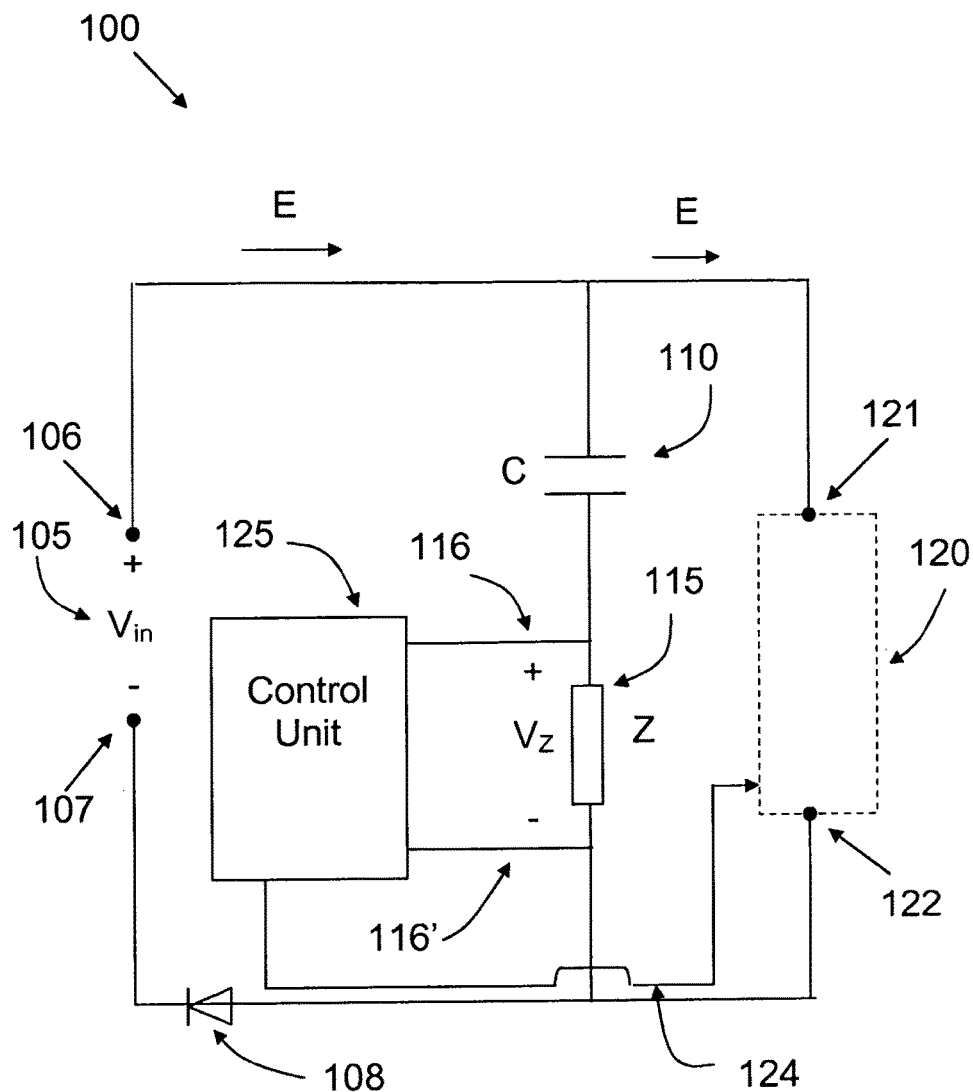

FIG. 2 shows the energy supply device 100 from FIG. 1, but here the energy flow E during normal operation, i.e. operation in a "steady state" is shown: as can be seen, the energy E from the connected energy source 105 goes to the connected energy consumer 120; the hold-up capacitor 110 is passive here.

Figure 3:
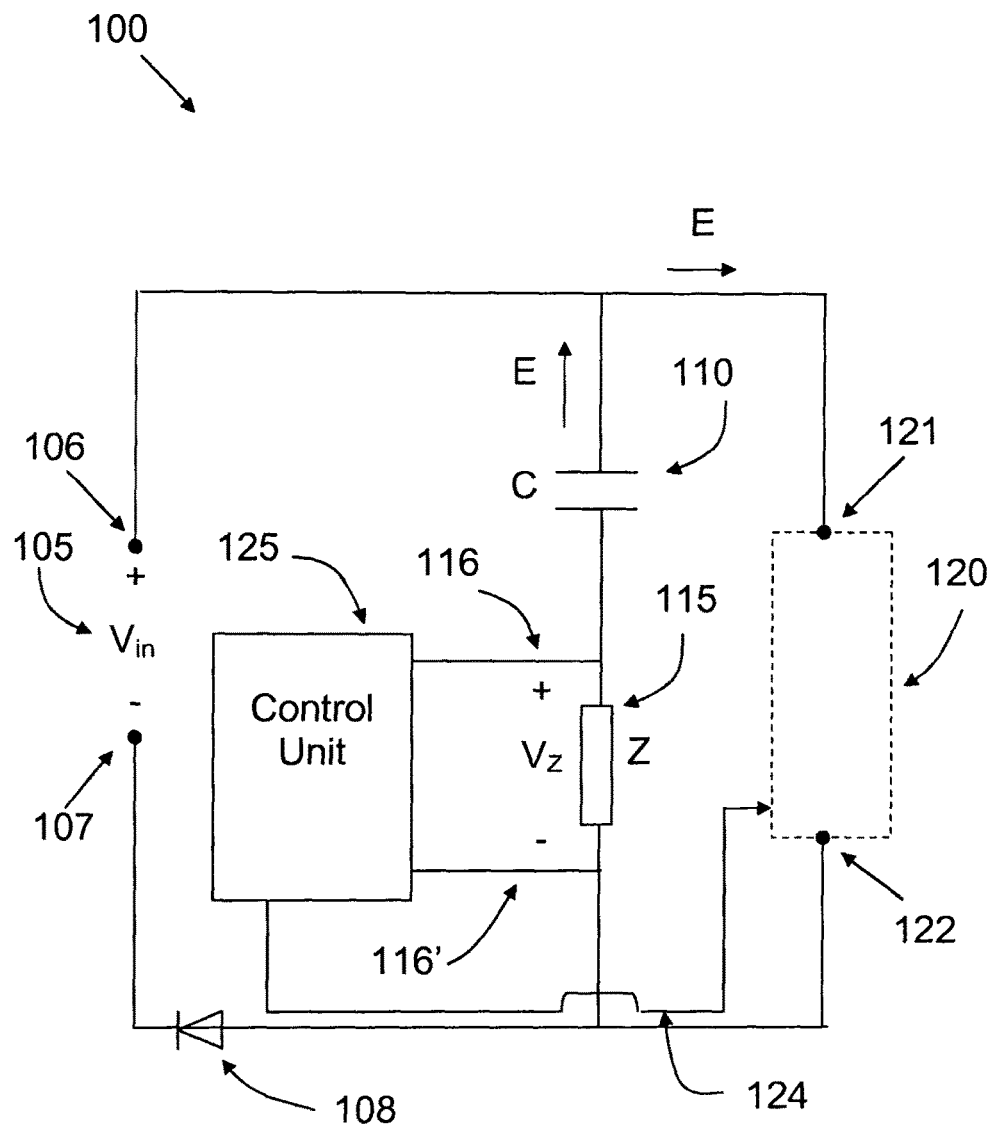

FIG. 3 shows the energy supply device 100 from FIGS. 1 and 2, but here the energy flow E during a power interruption such as a PLD event is shown: as can be seen, there is no energy coming from the energy source 105; instead, the hold-up capacitor 110 now discharges its stored energy towards the connected energy consumer 120, i.e. energy E goes from the hold-up capacitor 110 towards the energy consumer 120.

Figure 4:
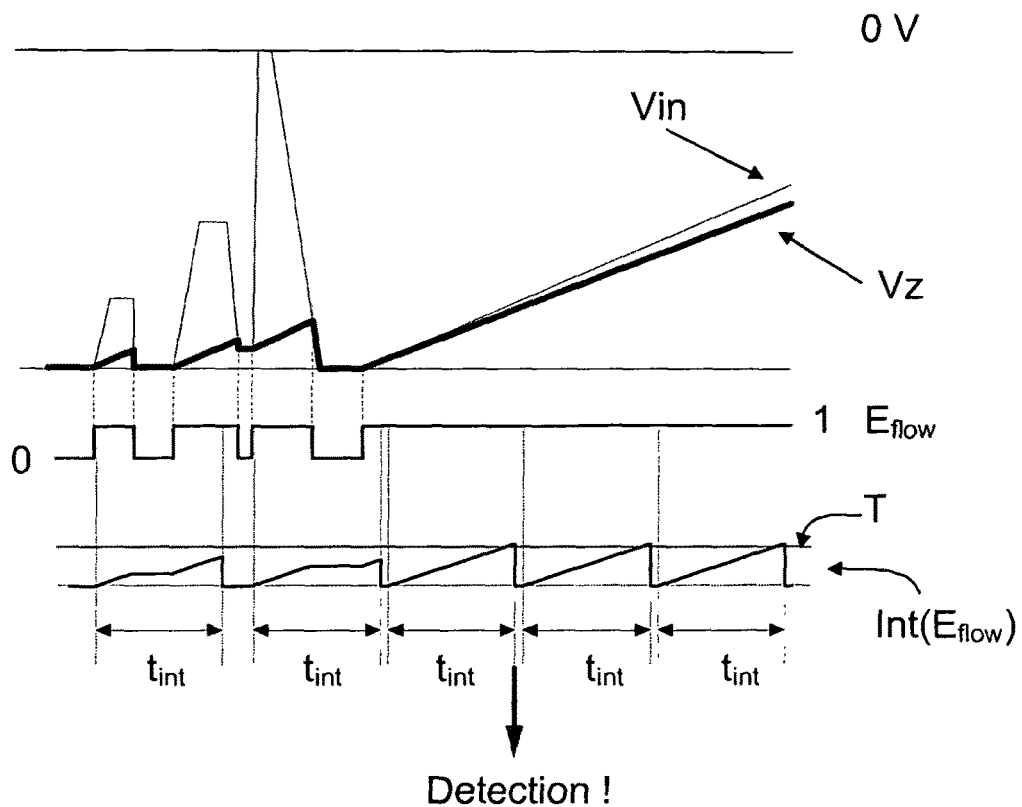
FIG. 4 shows the detection of a power disturbance.

FIG. 4 shows how the control unit 125 is arranged to detect a PLD event. FIG. 4 shows the voltage Vin from a connected energy source 105 as well as the voltage Vz over the impedance Z 115, and we can see the variations in the voltages Vin and Vz. It should be noted that in the example shown in FIG. 4 (and later on, in FIG. 5 as well), a system is shown which operates at an input voltage of −48 V. Thus, a PLD event or a power outage will (nominally) cause the voltage Vin to increase, since the voltage moves from −48V to 0V, as opposed to a system with a positive input voltage, where a PLD event or a power outage will cause the voltage Vin to decrease as it moves towards 0V.

The control unit 125 is arranged to create an "energy flow direction signal" $E_{flow}$, which is considered to be "true", i.e. assigned the value 1, if energy flows from the hold-up capacitor 110 (presumably towards a connected energy consumer 120), and considered to be "false", i.e. assigned the value 0, if energy does not flow from the hold-up capacitor 110. The "energy flow direction signal", $E_{flow}$, is created by means of the control unit's detection of the voltage Vz over the impedance Z 115: the polarity of the voltage Vz over the impedance Z 115 is used to detect the direction of energy flow (in the form of a current) from/to the hold-up capacitor 110. If the voltage Vz changes polarity, this is an indication that the energy flow (in the form of a current) through the impedance Z 115 has changed direction, which in turn indicates that there is a corresponding change in direction of the energy flow (in the form of a current) through the hold-up capacitor 110.

In embodiments, the control unit 125 is arranged to compare variations in the voltage Vz to a threshold value in order to "filter" out variations in Vz which are so small that they can be disregarded. Such variations may be due to, for example, "noise" in the power from the power supply.

FIG. 4 shows how $E_{flow}$ shifts between the two states "true" and "false". If $E_{flow}$ assumes the true state, i.e. the value "1", this is taken by the control unit 125 as a sign that energy flows from the hold-up capacitor 110, and the control unit then starts to integrate the $E_{flow}$ during a certain amount of time $t_{int}$; in other words, if $E_{flow}$ assumes the value "1", an "integration window" $t_{int}$ is opened in the control unit 125, during which window the value of the "energy flow direction signal" is integrated in the control unit 125. If, during this window, the integrated value reaches a certain predefined threshold level T, the control unit 125 is arranged to consider that a PLD event has been detected, as shown in FIG. 4, since this means that energy has flowed from the hold-up capacitor 110 during a pre-defined length of time, which may be the entire integration window, or a part of it, or the sum of parts of it.

The control unit 125 is also arranged to, in the case of a detection of a PLD event, send an alarm signal to a connected energy consumer 120, so that the energy consumer can initiate the steps associated with a PLD event, for example a controlled shut-down or a switch-over to an auxiliary power source.

Figure 5:
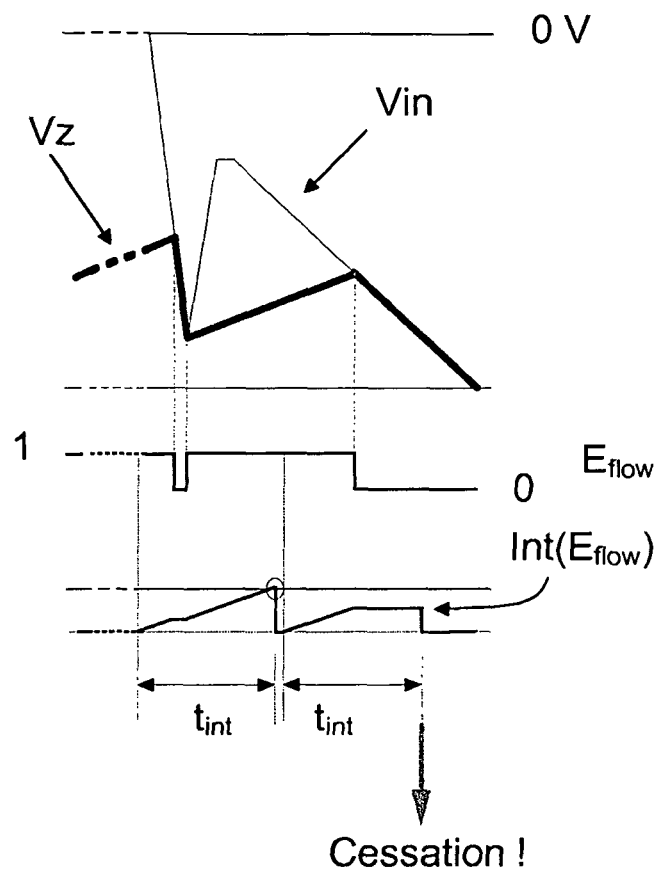
FIG. 5 shows the detection of the cessation of a power disturbance.

Suitably, the energy supply device 100 is also arranged to detect the cessation of a PLD event, and to signal an energy consumer 120 in the event that such a cessation is detected. This is shown in FIG. 5: use is made of the same "energy flow direction signal" $E_{flow}$, as mentioned above, as well as the "integration window" $t_{int}$ mentioned above, which is opened or initiated when the "energy flow direction signal" $E_{flow}$ assumes the "true" state. If during such an integration window, the integrated signal does not reach a certain predefined threshold level T' (which can be the same as the threshold level T of FIG. 4, i.e. the threshold level used in the case of detection of PLD events, or it can be another threshold level), the control unit is arranged to consider that cessation of a PLD event has been detected, as shown in FIG. 5, since this means that no energy has flowed from the hold-up capacitor 110 during a predefined length of time, which may be the entire integration window or a part of it, or the sum of parts of it. The integration window used to detect a cessation may be of the same length as the one used in the case of detection, or another length, and similarly, the threshold levels T and T' may be the same or different.

In similarity to the detection of PLD events described above, in embodiments, the control unit 125 is also in the case of detecting cessations arranged to compare variations in the voltage Vz to a threshold value in order to "filter" out variations in Vz which are so small that they can be disregarded. Such variations may be due to, for example, "noise" in the power from the power supply. The threshold value used here may be the same as in the case of detection of PLD events or another value.

Suitably, the control unit 125 is also arranged to, in the case of a detection of cessation of a PLD event, send a corresponding signal to a connected energy consumer 120, so that the energy consumer can initiate the steps associated with the cessation of a PLD event, for example start-up, or disconnecting from an auxiliary power source.

Figure 6:
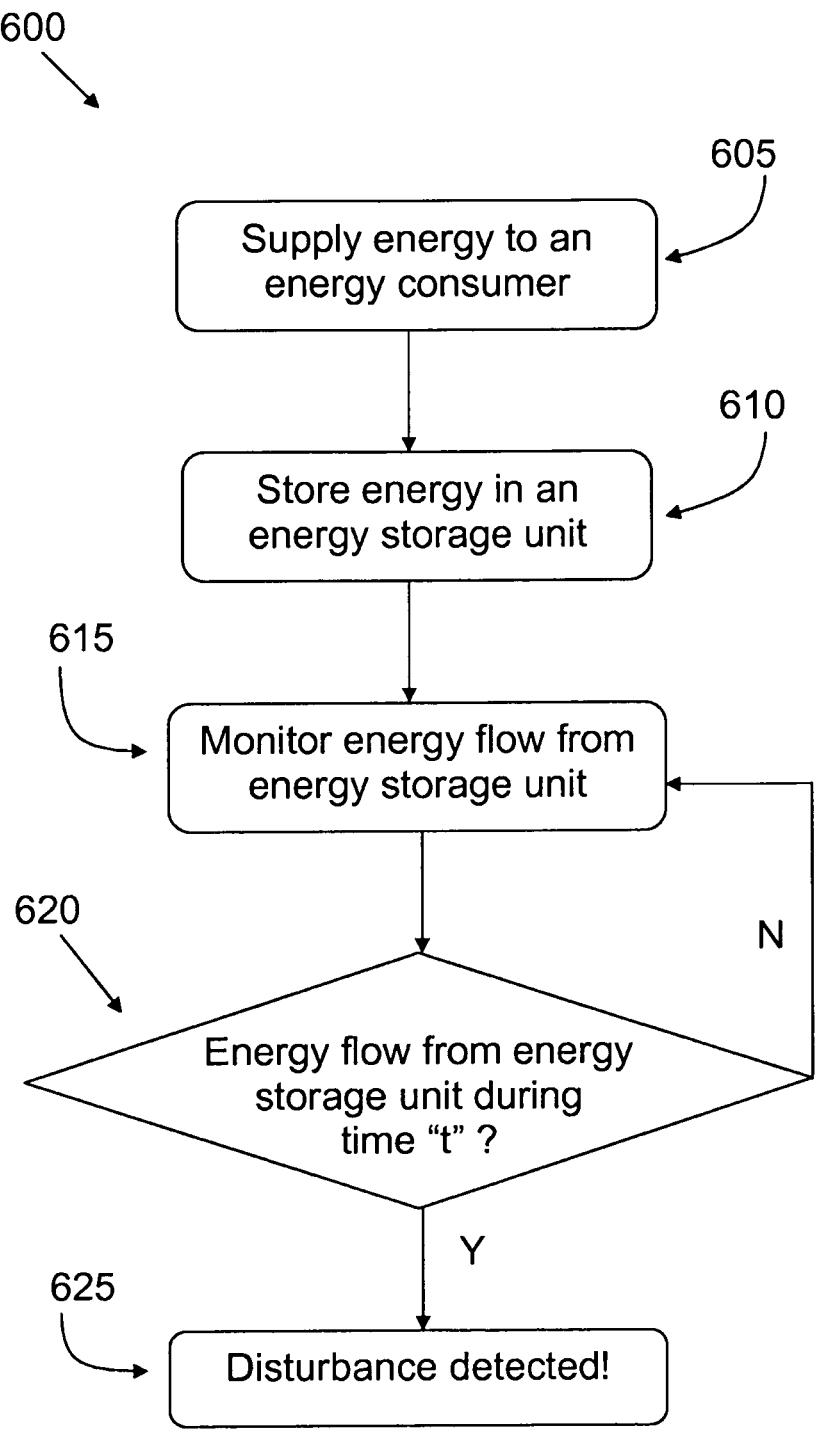
FIG. 6 shows a flow chart of a method of the invention.

FIG. 6 shows a schematic flow chart of a method 600 for detecting a disturbance in the power supplied from a power supply to an energy consumer. The method 600 comprises, step 605, supplying energy from the energy supply to the energy consumer and also, step 610, storing energy in an energy storage unit which is connected to the energy consumer.

The method 600 further comprises, step 615, monitoring the energy flow from the energy storage unit, and, if, as shown in step 620, there is an energy flow from the energy storage during a predefined length of time (shown as "t" in step 620 of FIG. 6), and then, step 625, detecting a disturbance in the power supplied from the power supply to the energy consumer. An energy flow from the energy storage during a predefined length of time is detected in the manner described in connection with the description of FIG. 4 above.

The term "detecting a disturbance" is here used in the sense that a disturbance is considered to have occurred.

In embodiments, the method 600 further comprises sending an alarm signal to the energy consumer in the case of detection of a disturbance in the power supplied from the power supply to the energy consumer.

In embodiments, the method 600 further comprises preventing a flow of energy from the energy storage means to the energy supply.

In embodiments, according to the method 600, a disturbance in the power supplied from the power supply to the energy consumer is detected if there is an energy flow change over the energy storage unit as well as an energy flow change over the energy supply which is more rapid than the energy flow change over the energy storage unit during said predefined length of time.

In embodiments, the method 600 comprises arranging the energy storage unit so that an energy flow change over the energy storage unit will always be slower than an energy flow change over the energy source.

In embodiments, the method 600 comprises detecting the cessation of a disturbance in the power supplied from the power supply to the energy consumer if, following a detection of disturbance, there is no energy flow from the energy storage means (110) during a predefined length of time.

The absence of an energy flow, i.e. no energy flow, from the energy storage during a predefined length of time is detected in the manner described in connection with the description of FIG. 5 above.

The term "detecting the cessation" is here used in the sense that a cessation is considered to have occurred.

In embodiments, the method 600 comprises sending a signal to the energy consumer that the detected disturbance in the power supplied from the power supply to the energy consumer has ceased.

According to embodiments of the method 600, the cessation of a disturbance in the power supplied from the power supply to the energy consumer is detected if there is also a voltage increase over the energy storage unit and a voltage increase over the power supply, and the two voltage increases do not differ from each other more than a predefined limit. The term "voltage increase" is here used to refer to a voltage increase over a certain amount of time, e.g. the increases in Vin and Vz shown as leading to the detection of a cessation in FIG. 4.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:
1. An energy supply device having a connection for an energy source and a connection for an energy consumer, the energy supply device being arranged to feed energy from a connected energy source to a connected energy consumer, the energy supply device comprising:
   energy storage unit arranged to store the energy from a connected energy source and to supply a connected energy consumer with the stored energy in an event of an interruption of energy supply from said energy source;
   a control unit; and
   a sensor for sensing one of a first energy flow of the energy to the energy storage unit and a second energy flow of the stored energy from the energy storage unit, said sensor being connected to the control unit, with the control unit being configured to:
      detect a change in the one of the first energy flow of the energy to the energy storage unit and the second energy flow of stored energy from the energy storage unit;

in response to the detected change, initiate integration of the second energy flow of stored energy from the energy storage unit to generate an integrated energy flow value; and detect a power disturbance if the integrated energy flow value is greater than a predefined limit during a predefined length of time.

2. The energy supply device of claim 1, in which the control unit is arranged to send an alarm signal to the energy consumer in a case of a detection of the power disturbance.

3. The energy supply device of claim 1, being arranged to prevent the second energy flow from flowing to a connected energy source.

4. The energy supply device of claim 1, in which the control unit is arranged to detect the power disturbance if there is an energy flow change over the energy storage unit as well as an energy flow change over a connected energy source which is more rapid than the energy flow change over the energy storage unit during said predefined length of time.

5. The energy supply device of claim 1, in which the energy storage unit is arranged so that an energy flow change over the energy storage unit will always be slower than an energy flow change over a connected energy source.

6. The energy supply device of claim 1, in which the control unit is arranged to detect a cessation of the power disturbance if, following the detected power disturbance, the integrated energy flow value being based on the sensed second energy flow of the stored energy from the energy storage unit during the predefined length of time is less than the predefined limit.

7. The energy supply device of claim 6, in which the control unit is arranged to detect the cessation of the power disturbance if there is also a voltage increase over the energy storage unit and a voltage increase over a connected power supply, and the two voltage increases do not differ from each other more than a predefined limit.

8. The energy supply device of claim 6, the control unit being further arranged to send a signal to the energy consumer when the cessation has been detected.

9. A method for detecting a disturbance in power supplied from a power supply to an energy consumer, the method comprising:

supplying energy from the power supply to the energy consumer and also storing energy in an energy storage unit which is connected to the energy consumer;

monitoring one of a first energy flow of the energy to the energy storage unit and a second energy flow of the stored energy from the energy storage unit;

detecting a change in one of the first energy flow of the energy to the energy storage unit and the second energy flow of the stored energy from the energy storage unit;

in response to the detected change, initiating integration of the second energy flow of the stored energy from the energy storage unit to generate an integrated energy flow value; and detecting a disturbance in the power supplied from the power supply to the energy consumer if the integrated energy flow value is greater than a predefined limit during a predefined length of time.

10. The method of claim 9, further comprising sending an alarm signal to the energy consumer in a case of detection of the disturbance in the power supplied from the power supply to the energy consumer.

11. The method of claim 9, further comprising preventing the second energy flow from flowing to the power supply.

12. The method of claim 9, the disturbance in the power supplied from the power supply to the energy consumer being detected if there is an energy flow change over the energy storage unit as well as an energy flow change over the energy supply which is more rapid than the energy flow change over the energy storage unit during said predefined length of time.

13. The method of claim 9, further comprising arranging the energy storage unit so that an energy flow change over the energy storage unit will always be slower than an energy flow change over the power supply.

14. The method of claim 9, further comprising detecting a cessation of the disturbance in the power supplied from the power supply to the energy consumer if, following the detection of the disturbance, the integrated energy flow value based on the monitored second energy flow of the stored energy from the energy storage unit during the predefined length of time is less than a predefined limit.

15. The method of claim 14, further comprising sending a signal to the energy consumer that the detected disturbance in the power supplied from the power supply to the energy consumer has ceased.

16. The method of claim 14, according to which the cessation of the disturbance in the power supplied from the power supply to the energy consumer is detected if there is also a voltage increase over the energy storage unit and a voltage increase over the power supply, and the two voltage increases do not differ from each other more than a predefined limit.

17. The energy supply device of claim 2, being arranged to prevent the second energy flow from flowing to a connected energy source.

18. The energy supply device of claim 17, in which the control unit is arranged to detect the power disturbance if there is an energy flow change over the energy storage unit as well as an energy flow change over a connected energy source which is more rapid than the energy flow change over the energy storage unit during said predefined length of time.

19. The method of claim 10, further comprising preventing the second energy flow from flowing to the energy supply.

20. The method of claim 19, the disturbance in the power supplied from the power supply to the energy consumer being detected if there is an energy flow change over the energy storage unit as well as an energy flow change over the energy supply which is more rapid than the energy flow change over the energy storage unit during said predefined length of time.

* * * * *